United States Patent
Menjak et al.

(10) Patent No.: US 6,749,040 B1
(45) Date of Patent: Jun. 15, 2004

(54) ELECTRIC POWER ASSISTED RACK AND PINION SYSTEM

(75) Inventors: Zdravko Menjak, Troy, MI (US); James Myrl Card, Lighthouse Point, FL (US); Ratko Menjak, Frankenmuth, MI (US)

(73) Assignee: Delphi Technologies, Inc., Troy, MI (US)

(*) Notice: Subject to any disclaimer, the term of this patent is extended or adjusted under 35 U.S.C. 154(b) by 41 days.

(21) Appl. No.: 10/070,023
(22) PCT Filed: Sep. 1, 2000
(86) PCT No.: PCT/US00/24351
§ 371 (c)(1), (2), (4) Date: Feb. 26, 2002
(87) PCT Pub. No.: WO01/15956
PCT Pub. Date: Mar. 8, 2001

Related U.S. Application Data
(60) Provisional application No. 60/159,796, filed on Oct. 15, 1999, and provisional application No. 60/151,829, filed on Sep. 1, 1999.

(51) Int. Cl.⁷ .................................................. B62D 5/04
(52) U.S. Cl. ....................................................... 180/443
(58) Field of Search ................................. 180/427–444

(56) References Cited

U.S. PATENT DOCUMENTS

| | | | | | |
|---|---|---|---|---|---|
| 4,664,211 A | * | 5/1987 | Oshita et al. | ............... | 180/446 |
| 4,819,170 A | * | 4/1989 | Shimizu | ...................... | 701/41 |
| 4,825,972 A | * | 5/1989 | Shimizu | ...................... | 180/444 |
| 5,429,202 A | * | 7/1995 | Millard et al. | ............... | 180/400 |
| 6,129,171 A | * | 10/2000 | Takaoka | ...................... | 180/444 |
| 6,155,376 A | * | 12/2000 | Cheng | ......................... | 180/444 |
| 6,164,407 A | * | 12/2000 | Cheng | ......................... | 180/444 |
| 6,488,115 B1 | * | 12/2002 | Ozsoylu et al. | ............. | 180/444 |
| 6,615,947 B2 | * | 9/2003 | Ozsoylu et al. | ............. | 180/443 |

* cited by examiner

*Primary Examiner*—Lesley D. Morris
*Assistant Examiner*—Paul Royal, Jr.
(74) *Attorney, Agent, or Firm*—Michael D. Smith

(57) ABSTRACT

"An electrically operated power steering apparatus has an electric motor disposed parallel to a rack shaft. The system is designed such that the motor can be installed in any angle around a rack housing of smaller diameter. This permits easy installation and flexibility of design. The apparatus is also designed to accommodate off-the-shelf electric motors that are commercially available so as to eliminate the need to customize an electric motor for each application."

13 Claims, 5 Drawing Sheets

ELECTRIC POWER ASSISTED RACK AND PINION SYSTEM

CROSS-REFERENCE TO RELATED APPLICATIONS

This application is based on, and claims the benefit of, U.S. Provisional Patent Application Nos. 60/159,796, filed on Oct. 15, 1999, and 60/151,829, filed on Sep. 1, 1999, the disclosures of both of which are incorporated by reference herein in their entirety.

FIELD OF TECHNOLOGY

The present invention relates to an electric servo assist steering system.

BACKGROUND OF THE INVENTION

It is known to electrically operate power steering apparatus for assisting the driver of a vehicle to turn a steering wheel.

In the known art of electric power assist, the steering torque of a steering shaft coupled to the steering wheel is detected and an electric motor is energized based on the detected steering torque. The rotational power of the electric motor is transmitted through a ball-and-nut mechanism to the rack shaft to assist in turning the road wheels.

In the electrically operated power steering apparatus disclosed in Japanese laid-open patent publication No 59-50864, a ball-and-nut mechanism is positioned substantially centrally on a rack shaft, and the rack shaft is radially supported at five locations including bushings. It is difficult to keep the rack shaft in full coaxial alignment at all of the five supporting locations. Because of alignment errors of the rack shaft, different dimensional and assembling errors of the parts, and flexing displacements of the rack shaft caused by loads applied through tires and tie rods, the ball-and-nut mechanism and a rack-and-pinion mechanism are subject to undue forces tending to displace or deform them or tend to suffer undesirable friction.

When this happens, the driver of the vehicle experiences poor steering feel and the efficiency of the electric motor of the power steering apparatus is lowered.

An electric power assisted steering system is disclosed in Japanese laid-open utility model publication No 59-172072, wherein a rack shaft is radially supported at two locations, i.e., a ball-and-nut mechanism and a rack-and-pinion mechanism. Because the rack shaft is radially supported at two positions and is maintained in better coaxial alignment at those supporting positions, it is subjected to less undue forces. However, the rotor of an electric motor of the electrically operated power steering apparatus is supported in a cantilevered fashion due to its structural limitations. As a result, the distal end of the rotor is liable to interfere with an iron core that is fixed to rake housing.

In the electrically operated power steering apparatus disclosed in U.S. Pat. No. 5,650,701 an electric motor is disposed coaxially around the rack shaft in a housing, the electric motor comprising a stator fixedly mounted in the housing and hollow rotor rotary supported in the housing by a pair of bearings mounted on respective opposite ends of the rotor, the ball-and-nut mechanism being coupled to the rotor, rack shaft axially passing through motor rotor. This arrangement results in a large diameter housing that creates problem for installation in vehicles, particularly smaller vehicles where space is at a premium. Motors integrated into a housing have specific and tailored part designs that require special production for very different car models thereby increasing cost. Vehicle serviceability is also more expensive because any failure in the motor requires replacement of the entire assembly. Further, the motor shaft is directly connected to the ball nut. Motor torque is transmitted to axial movement of rack—thereby requiring a large motor, large electric voltage for power, and larger dimensions of electric cable to generate the axial forces. Their design has large inertial masses that have a negative effect on vehicle steering.

SUMMARY OF THE INVENTION

Disclosed is an electrically operated power steering apparatus that has an electric motor disposed parallel to a rack shaft. The system is designed such that the motor can be installed in any angle around a rack housing of small diameter. This permits easy installation and flexibility of design. The apparatus is also designed to accommodate off-the-shelf electric motors that are already commercially available so as to eliminate the need to customize an electric motor for each application.

The transfer of rotational energy from motor shaft to ball nut (secondary reducer) is realized by a primary reducer—a belt, silent chain, or gearing transmission. This primary reduction transmission will effect a large torque on the ball-nut and a larger axial force on the rack shaft that will satisfy the needs of even large vehicles. A smaller motor will be required, thereby also reducing the inertial mass on the rack.

There is no need for large motors, high voltages or amperages, or large diameters of electric cable for large axial steering forces requested by large vehicle.

Less expensive vehicle serviceability is achieved because a defective motor may be replaced without having to replace the entire steering apparatus.

A ball nut is installed between two angular contact ball bearings, which permit small angular rotations of the ball nut under steering forces. This reduces friction and insures smooth function of the ball-and-nut mechanism and the rack-and-pinion mechanism. Finally, the driver of the vehicle has a fine, smooth, quiet and comfortable steering feel, even driving large vehicles.

The motor-shaft and rotor are not directly fixed on the ball nut and adaptive ball-nut movements therefore do not disturb motor function.

The rack and pinion will also preferably have a "V" shape and needle bearing, which has the effect of preventing rotation of the rack and reduces the friction associated with movement.

The housing may be covered by a strong one-piece ferrous cover. This cover rigidly holds the correct distance between two angular contact bearings even at high temperatures. Belt, gearing, or silent chain transmission is installed inside the housing cover.

The steering wheel rotation is transmitted to the upper portion of the pinion shaft assembly. The pinion upper and lower shafts are connected by a torsion bar. Relative rotation of the upper pinion shaft relative to the lower pinion shaft is detected by torque sensor. This information is transmitted to an Electronic Control Unit that powers the electric motor. Rotation of electric motor is transmitted to axial movement of rack shaft by belt transmission and ball-and-nut mechanism. This steering system uses energy only when it works, saving energy in comparison to traditional hydraulic power systems, which use hydraulic pumps that consume energy even when the vehicle is stationary.

The power steering system of this invention has a lower negative impact on environment relative to actual hydraulic power system because of the cleaner exhaust and lack of hydraulic fluids.

DETAILED DESCRIPTION OF THE PREFERRED EMBODIMENTS

The disclosures herein are compatible with, and may be combined with, those of U.S. Provisional Application Serial No. 60/151,966 filed Sep. 1, 1999; U.S. Provisional Application Serial No. 60/154,607 filed Sep. 17, 1999; and U.S. Provisional Patent Applications having Serial Nos. 09/650,869 and 09/633,549, both filed on Oct. 15, 1999; the disclosures of all four of which are incorporated herein by reference in their entirety.

Figure 1:
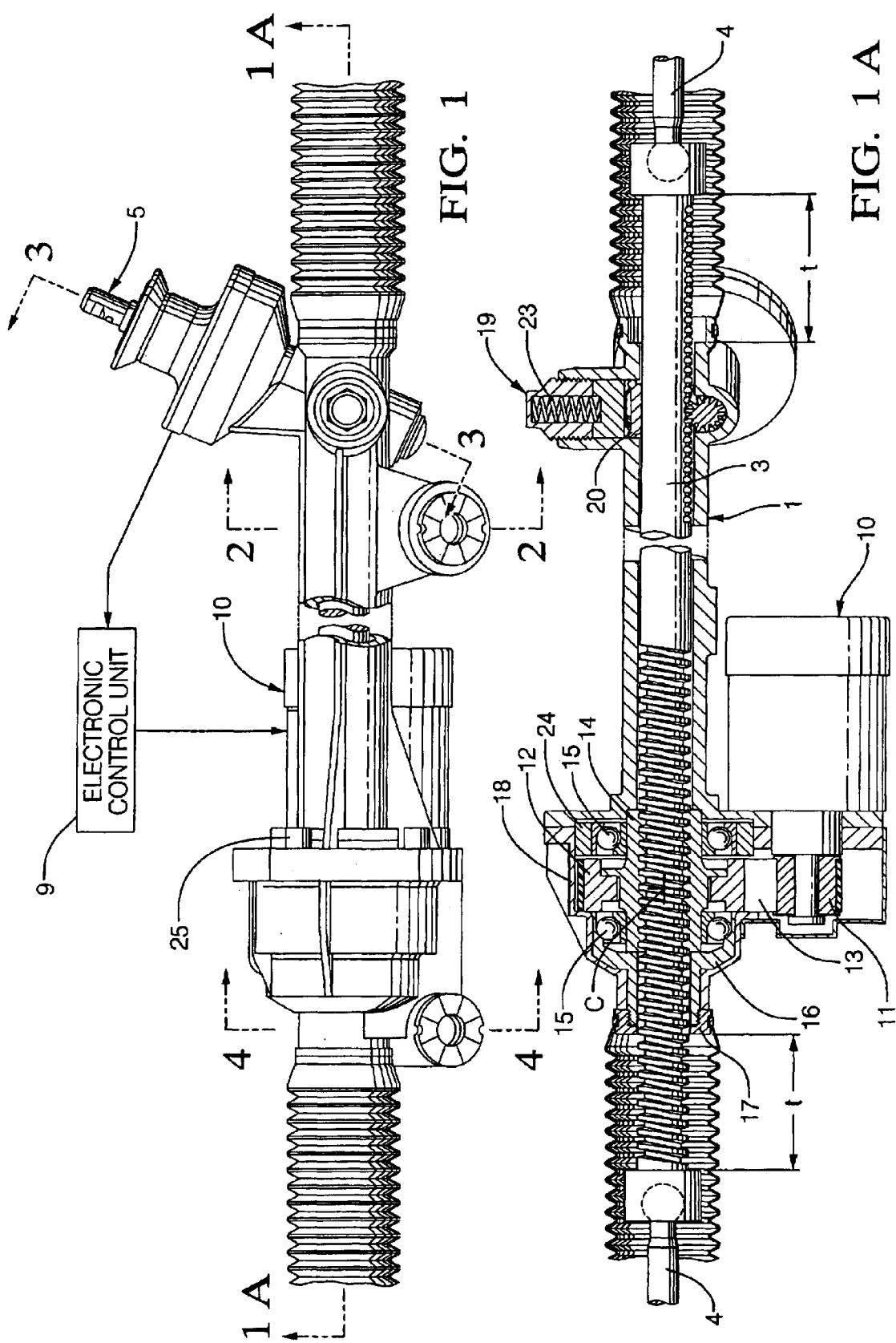
FIG. 1 is outside view and cross-sectional view A—A of electric servo assist rack-and-pinion according to an embodiment of the present invention.
Figure 2:
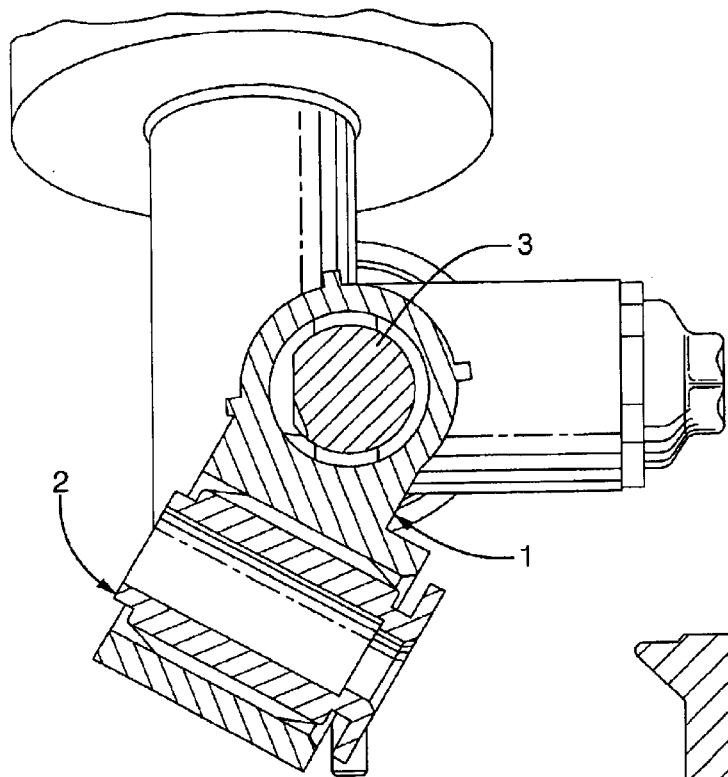
FIG. 2 is an transversal cross-sectional view E—E of rack-and-pinion mechanism of the electric servo assist apparatus shown in FIG. 1.

As shown in FIG. 1 an electrical servo assisted rack-and-pinion with parallel motor-rack and ball screw, according to an embodiment of the present invention, has an elongate cylindrical housing 1, preferably composed of a single block of cast aluminum alloy. Rack housing 1 has incorporated therein the housing of installation silent block 2 (FIG. 2); pinion housing and housing of spring adjuster mechanism.

The electric servo assist rack-and-pinion also has a rack shaft 3 inserted in the housing 1. Rack shaft 3 is coupled to respective tie rods 4 that are connected to respective road wheels of a vehicle (not shown). When the rack shaft 3 moves axially (horizontally in the drawing), it causes the tie rods 4 to turn road wheels to steer the vehicle. The range of travel is labeled with a lowercase "t" in FIGS. 1 and 5.

Rotation of the vehicle steering wheel (not shown) causes rotation of the upper portion of the steering shaft 5, (FIG. 1 and FIG. 3) about its own axis.

Rotation of the upper portion steering shaft 5 effects twisting of torsion bar 6 (FIG. 3), causing relative rotation of the upper portion steering shaft 5, to the lower portion of the steering shaft-pinion 7. Torque sensor 8 detects the relative rotation of the upper portion steering shaft 5 to pinion 7 and sends a signal to the Electric Control Unit 9. The Electric Control Unit 9 powers the electric motor 10.

Empowered electric motor 10 then rotates small pulley 11 that rotates large pulley 12 by belt 13. The ratio of large pulley and small pulley diameter increases the motor torque on the large pulley 12. A relatively small electric motor 10 with a pulley ratio of about 3:1 can thereby satisfy the needed steering force on rack shaft 3 for most large vehicles. Of course, this pulley arrangement may be replaced with gears for greater precision and reliability, but at greater cost. A preferred compromise would be a chain drive. The term "gear ratio" will be construed to encompass all such systems, whether gear or pulley.

The great advantage of this arrangement is that the motor may be placed just about anywhere around the perimeter of the rack axis, depending on where space is needed for the particular design of the car. By utilizing a gear ratio, expensive high-torque motors may be avoided. Notice that serviceability is greatly improved because the motor is easily removed and replaced, along with its gear or pulley. The motor is removably mounted for easy access and serviceability, so that the entire rack need not be replaced when the motor or motor gear fails.

Large pulley 12 is affixed to ball nut 14 and transmits rotation to ball nut 14. Ball nut 14 is rotationally installed between two robust ball bearings 15 with angular contact.

Rotation of ball nut 14 is transformed into axial movement of the rack shaft 3 through a ball screw mechanism. Winding ball travel is provided on one side of rack shaft 3 while rack teeth are provided on the other side of the rack shaft. The ball-and-nut mechanism is most preferably without backlash. Adjustment of the space in two bearings may be accomplished by adjustment nut 16, which is locked by lock nut 17.

Ball bearing 15 is preferably designed to permit a small angular movement of ball nut 14 around point "C" (FIG. 1). A preferred means of accomplishing this is disclosed in U.S. patent application Ser. No. 60/154.607, the disclosures of which are incorporated herein in their entirety. This small angular rotation of ball nut 14 will be under small elastic deflection of rack shaft 3, avoiding large friction in the ball-and-nut mechanism and insuring smooth, comfortably steering of the vehicle.

Ball nut 14, bearings 15 and large pulley 12 are disposed inside ball nut housing 18. It is preferred that the ball nut housing 18 strongly holds constant the distance between the two angular contact bearings 15, even under high temperatures. It is preferred that this housing be made of a ferrous metal or similarly strong material and heat-resistant material. The ball nut 14 will preferably integrate the housing of a second installed silent block 2 that transfers steering forces to the vehicle body.

On the other side of rack shaft 3, the teeth of pinion 7 are meshed with the teeth of rack shaft 3. It is preferred that a spring adjuster mechanism 19 (FIGS. 1, 3 and 5), or other equivalent apparatus, be provided to eliminate any backlash between the rack 3 and the pinion 7.

Figure 3:
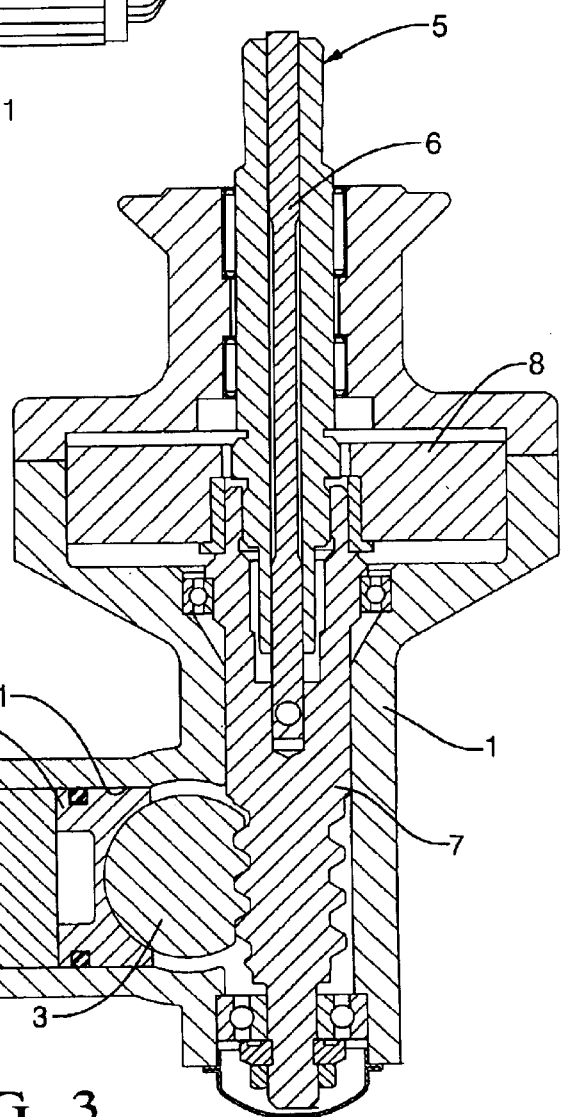
FIG. 3 is an transversal cross-sectional view B—B of rack-and-pinion mechanism of the electric servo assist apparatus shown in FIG. 1.
Figure 4:
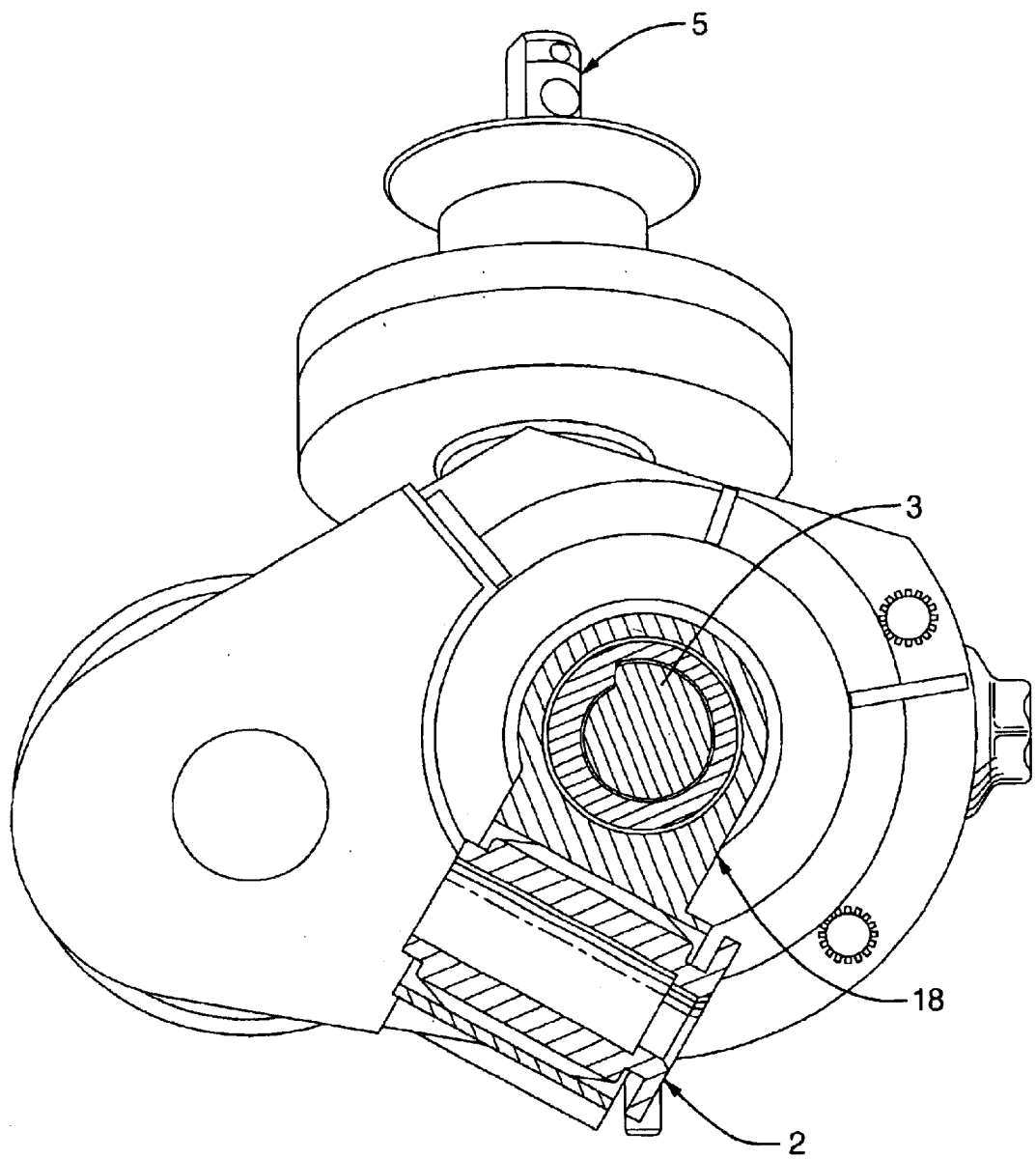
FIG. 4 is an transversal cross-sectional view D—D of rack-and-pinion mechanism of the electric servo assist apparatus shown in FIG. 1.

As shown in FIG. 3, the housing 1 has a cylinder 21 positioned laterally of the pinion 7. A rack bearing 20 is slideably disposed in the cylinder 21 and is in sliding contact with the rack shaft 3 behind the pinion 7. The cylinder 21 has an open end remote from the rack 3 and closed by a cap 22. The rack bearing 20 is normally biased by a spring 23 disposed under compression between the rack bearing 20 and the Cap 22 in a direction to bias the rack shaft 3 against the pinion 7. The rack shaft 3 is thus slideably supported by the rack bearing 20.

As illustrated in FIG. 1, the housing 1 has an axial end opening closed by a ball nut housing 18. Precise alignment between the housing 1 and ball nut housing 18 is insured by bearing spacer 24.

In the electric servo assist rack-and-pinion, with parallel motor rack, and ball screw steering mechanism shown in FIGS. 1 through 4, the rack shaft is supported at two locations over a large distance. One support is a rack bearing 20 that, under Spring 23, pushes rack shaft 3 toward pinion 7, thereby ensuring permanent contact between rack shaft 3 and pinion 7, even after wear of these two parts.

A second support is in the ball-and-nut mechanism that has ball nut 14 mounted in bearings 15 with possibility of small angular self-alignment with first support. This self-alignment covers any new position of rack 3 to pinion 7 and any elastic deformation of rack shaft 3 under steering forces. These coaxial self alignments substantially reduce friction and increase smooth steering.

Another advantage of the invention is that the ball-and-nut mechanism is installed in its own housing and does not disturb motor mechanism that is separately rigidly fixed on to housings. Motor torque is increasingly transferred to ball nut 14. The electric motor can be disassembled from the ball-and-screw mechanism and replaced with a new one without disassembling the ball-and-screw or rack-and-pinion mechanisms.

Figure 5:
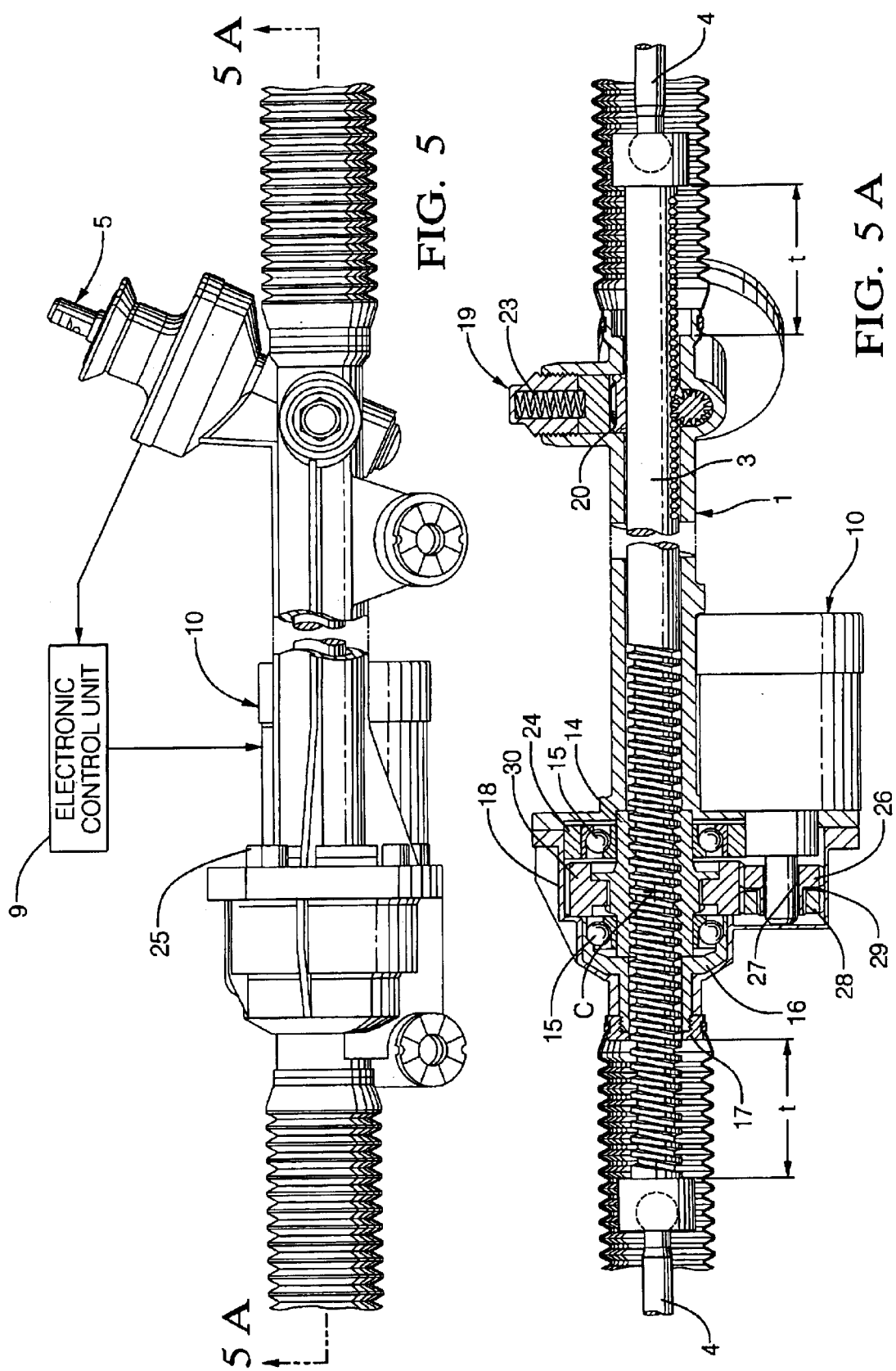
FIG. 5 is cross sectional view A—A of electric servo assists rack-and-pinion according to an other embodiment of the present invention where torque reducer is released by gearing.

FIG. 5 shows an Electric servo assist rack-and-pinion with parallel motor-rack and ball-screw, according to another embodiment of the present invention. Those parts shown in FIG. 5 that are identical to those shown in FIGS. 1 through 4 are denoted by identical reference numerals, and will not be described in detail below.

As shown in FIG. 5, electric motor 10 is disposed closer to housing 1. Motor torque is transmitted to ball nut 14 by a gearing transmission.

Motor torque on ball nut 14 is increased by reduction of the gearing transmission.

Primary smaller helical gear 26 is installed on motor shaft over tolerance rings 27. Secondary smaller helical gear 28 is installed over spline portion of primary smaller helical gear 26.

Back Lash spring 29 is installed between two smaller gears 26 and 28. Backlash spring pushes secondary smaller gear 28 away from primary smaller gear 26, thereby effecting contact opposite the side having the teeth of secondary smaller gear 28 with large gear 30. This movement eliminates backlash between teeth of the smaller and larger gears.

Tolerance rings 27 permit small angular adjustment of the smaller gears 26 and 28 to large gear 30. Tolerance rings 27 are calculated and dimensions determined in manner that they positively transfer motor torque, but slip under excessive torque, thereby protecting the gear teeth from overstress and breaking.

A silent chain transmission may be used instead of a gear or belt transmission.

Figure 6:
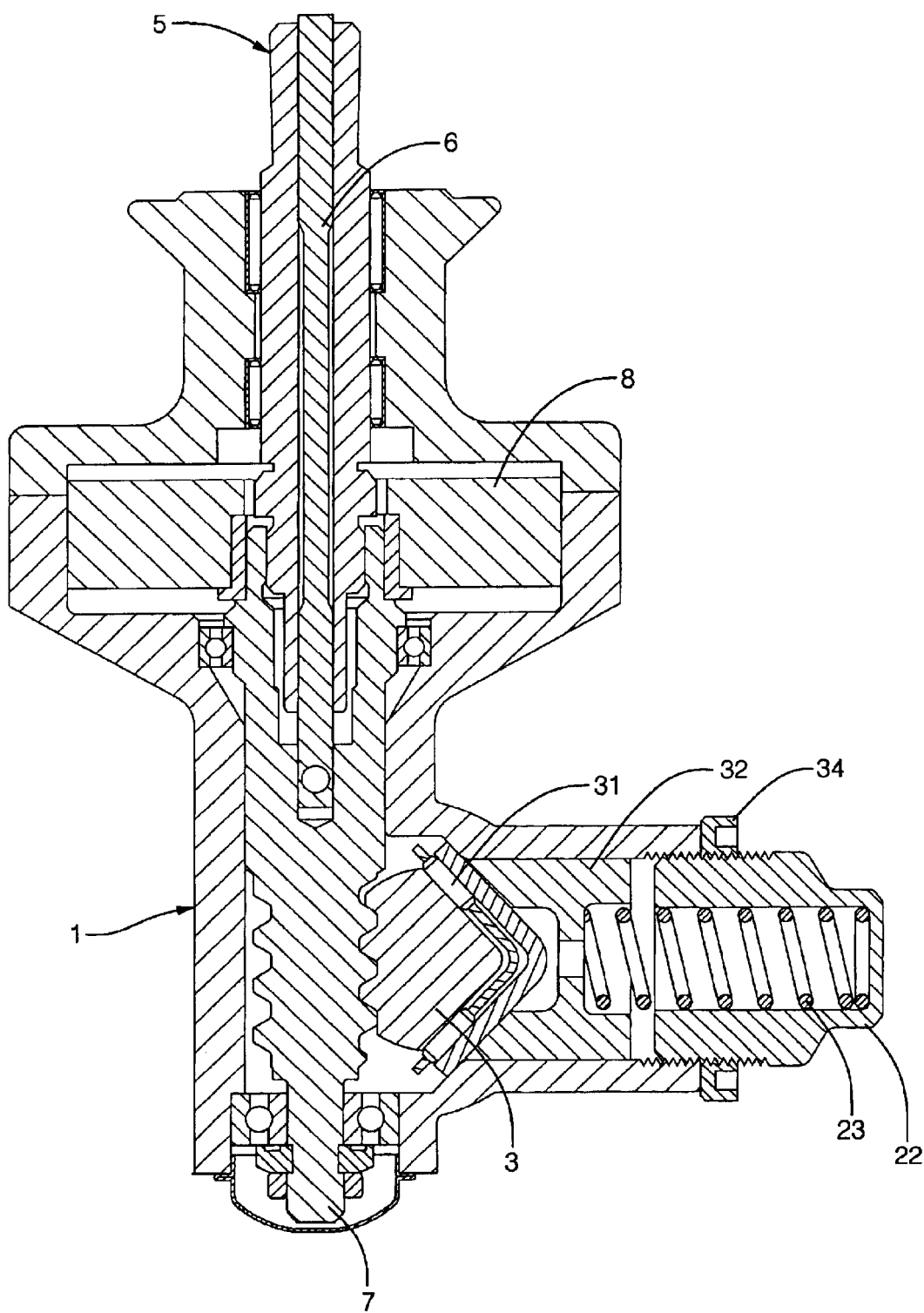
FIG. 6 is another embodiment of the invention having a v-shaped rack.

Referring to FIG. 6, there is depicted the preferred V-shaped embodiment of the rack 3, having a V-shaped needle bearing 31. The needle bearing 31 transfers force to a V-shaped guide 32, thereby significantly reducing friction between the rack 3 and the guide 32. Resilient means 23, such as a spring as shown will be used to bias the rack 3 against the pinion 7. A screw 22 and lock nut 34.

Although we have described what we consider to be the preferred embodiments of the invention, it will be understood that the invention may be embodied in other specific forms without departing from the essential characteristics and character thereof. The present embodiments are therefore to considered in all respects as illustrative, and not restrictive.

What is claimed is:

1. An electric motor assisted steering apparatus for a vehicle, comprising:
   a rack having an axis defining an axial direction and a length thereof, said rack adapted to turning of a set of road wheels, said rack supported at only two support locations along said length;
   a steering wheel and column, said steering wheel and column adapted to move said rack back and forth along said axial direction so as to turn said road wheels;
   an electric motor;
   a screw mechanism adapted to convert rotational motion into axial movement of said rack said screw mechanism is adapted to permit small angular movement around a point coinciding with the axis of said rack and axially displaced at where said screw mechanism is located along said rack;
   said electric motor removably mounted so as to be substantially easily replaceable without removal of said rack;
   said electric motor adapted to rotate said screw mechanism through a gear ratio;
   means for detecting a turning motion applied to said steering wheel by an operator of the vehicle; and
   a controller for empowering said electric motor in response to said detected turning motion.

2. The invention of claim 1 wherein said rack is V-shaped.

3. The invention of claim 2 where said V-shaped rack is in operable communication with said column via a pinion engaged with a first side defining said v-shaped rack while an opposite second side defining said V-shaped rack is biased against said pinion with a complimentary configured V-shaped needle bearing between resilent meand and said second side.

4. The invention of claim 3 wherein needle bearing transfers a force from said resilient means to said rack via a V-shaped guide significantly reducing friction between said rack and said guide.

5. The invention of claim 3 wherein said resilient means includes a spring configured to bias said rack against said pinion.

6. The invention of claim 3 wherein said resilient means allows deflection of said rack.

7. The invention of claim 3 wherein said only two support locations includes said screw mechanism and said needle bearing.

8. The invention of claim 1 wherein said electric motor adapted to rotate said screw mechanism through said gear ratio includes belt transmission between said electric motor and said screw mechanism.

9. The invention of claim 1 wherein said electric motor adapted to rotate said screw mechanism through said gear ratio includes gearing transmission between said electric motor and said screw mechanism.

10. The invention of claim 1 wherein said electric motor adapted to rotate said screw mechanism through said gear ratio includes chain transmission between said electric motor and said screw mechanism.

11. The invention of claim 1 further comprising:
    a rack housing, within which said rack travels in said axial direction; and
    wherein said electric motor is removably mounted to said rack housing so as to permit removal of said electric motor without removal of said rack or rack housing.

12. The invention of claim 1 further comprising:
    a rack housing, within which said rack travels in said axial direction; and
    wherein said electric motor is removably mounted to said rack housing so as to permit removal of said electric motor without removal of said rack or rack housing.

13. The invention of claim 1 wherein said adaptation for small angular movement further comprises:
    a ball nut mechanism;
    said ball nut mechanism mechanically interposed between said electric motor and said screw mechanism such that said electric motor rotates said ball nut mechanism, which in turn rotates said screw mechanism.

\* \* \* \* \*